United States Patent

Matsuura et al.

[11] Patent Number: 6,141,476
[45] Date of Patent: Oct. 31, 2000

[54] HOLLOW WAVEGUIDE FOR ULTRAVIOLET LIGHT AND MAKING THE SAME

[76] Inventors: Yuji Matsuura; Mitsunobu Miyagi, both of Elect. Commun. Dept., Tohoku Univ., Sendai 980-77, Japan

[21] Appl. No.: 09/002,669

[22] Filed: Jan. 5, 1998

[51] Int. Cl.[7] .................................................. G02B 6/20
[52] U.S. Cl. ............................................................ 385/125
[58] Field of Search .................................... 385/125, 123, 385/146

[56] References Cited

U.S. PATENT DOCUMENTS

| | | |
|---|---|---|
| 4,068,920 | 1/1978 | Bass . |
| 4,652,083 | 3/1987 | Laakman . |
| 4,913,505 | 4/1990 | Levy . |
| 4,930,863 | 6/1990 | Croitoriu et al. ........................ 385/125 |
| 5,276,761 | 1/1994 | Shimoyama . |
| 5,440,664 | 8/1995 | Harrington et al. ..................... 385/125 |

FOREIGN PATENT DOCUMENTS

| | | | |
|---|---|---|---|
| 60-247604 | 12/1985 | Japan | ....................................... 385/125 |
| 1-255808 | 10/1989 | Japan | ....................................... 385/125 |
| 2 180 363 | 3/1987 | United Kingdom | .................... 385/125 |

OTHER PUBLICATIONS

Kubo, ArF excimer laser delivery systems for medical applications Proceedings of SPIE, 1994, pp. 28–34, vol. 2131, SPIE, Bellingham U. S. A.

*Primary Examiner*—Hemang Sanghavi

[57] ABSTRACT

A hollow waveguide that transmits ultraviolet light with low attenuation. The present invention comprises a small-diameter, thin-wall, glass tube and a thin aluminum film on the inner surface of the glass tube. The aluminum film is deposited by a chemical vapor deposition method using an organometallic of aluminum as a precursor. The deposition process produces high smoothness of the film surface.

4 Claims, 5 Drawing Sheets

HOLLOW WAVEGUIDE FOR ULTRAVIOLET LIGHT AND MAKING THE SAME

BACKGROUND OF THE INVENTION

1. Field of the Art

This invention relates to waveguides for transmitting ultraviolet light, and more particularly to a flexible hollow waveguide for transmitting light emitted from excimer lasers.

2. Prior Art

Ultraviolet light has high photon energy because of the short wavelength. Therefore, by using a photochemical reaction or an ablation effect induced by ultraviolet light, many applications in a variety of fields have been developed. Excimer lasers excited in the wavelength region from 190 nm to 310 nm are especially appropriate for these applications because these lasers emit short light pulses with an extremely high peak power.

In the industrial field, these lasers are utilized in machining process, such as metal cutting and welding, and surface reforming. These lasers are also useful for material synthesis and deposition by using photochemical reaction and laser-assisted CVD method. In the medical field of ophthalmology, dermatology, dentistry and surgery, variety kinds of treatment are performed by utilizing laser ablation of human tissues.

Excimer lasers enable these applications, however, there is a barrier that restrains the laser applications from rapid growth. There exists no definitive delivery system that transmits high-energy light pulses of excimer lasers with high flexibility, low attenuation, and high reliability. Although articulated delivery systems comprising mirrors and arms are used in some applications, the system is not flexible enough for most of applications to deliver the laser beam to the target material. The delivery medium should be highly flexible for easy handling, low cost, and reliable, and also should bear high-energy light pulses of excimer lasers.

The conventional transmitting media of excimer laser beams or another light sources in the wavelengths of ultraviolet region are categorized into two types, silica-based glass fibers and hollow waveguides.

In silica-based glass fibers, both of the core and the cladding are formed by a glass which is mainly composed of fused silica. A common silica-glass fibers which is used in optical communications are not appropriate for delivery of ultraviolet light because impurities such as germanium contained in the glass induces Rayleigh-scattering losses in the short wavelengths. Therefore, some specially designed, silica-based glass fibers have been proposed to transmit the ultraviolet light.

A pure-silica glass fiber is one of the special fibers. Impurities remain in the glass are removed by heat treatment process and the optical fiber made of pure silica show reasonably low attenuation for ultraviolet light. However, the attenuation drastically increases after a number of high-energy pulses of excimer laser are transmitted in the fiber. This is due to E'-center generated in silica by the ultraviolet light or two-photon absorption of silica glass. Because these are intrinsic phenomenon in silica glass, it is hard to remove these effects.

A silica glass fiber doped with fluorine has been also proposed and developed for delivery of ultraviolet light, the energy threshold and reliability are still low because of the above effects of silica glass.

A hollow waveguide is the other type of the transmitting media for ultraviolet light. A hollow waveguide is expected to be the best of delivery media because the core region of the waveguide is the air that shows almost no absorption for ultraviolet light. The following are three types of hollow waveguides which have been proposed and developed, itemized (1), (2) and (3).

(1) A hollow waveguide composed of a metal tube: This type of waveguide is usually composed of a tube that is formed by a metal showing high reflectivity for ultraviolet light, such as aluminum. The inner surface of the metal tube is polished chemically or electrochemically to reduce the scattering loss of light due to surface roughness. By such a polishing, however, it is very hard to form a smooth surface that does not affect the reflectivity of ultraviolet light with the short wavelength. Usually the inner surface roughness of polished metal tube is greater than 500 nm in root-mean-square value that is much larger than the required roughness of 50 nm. Therefore, this type of waveguide has not been successfully developed so far.

(2) A hollow waveguide using a glass tube with a metal coating outside the tube: An example of such a waveguide is disclosed in U.S. Pat. No. 5,276,761. This type of waveguide has an advantage on its easy fabrication process. It is very easy to deposit a metal film on the outside of the glass tube by using a conventional vacuum evaporation or sputtering process. However, the transmission loss of the waveguide is usually high because the reflectivity of the glass material is low even when its outside surface is coated with a metal. Furthermore, a large portion of the energy of transmitted light is confined in the glass wall since a glass is relatively transparent for ultraviolet light and a glass has a higher refractive index than the air core. This causes a fatal damage on the waveguide when a high energy of excimer laser light is launched into the waveguide.

(3) A hollow waveguide with rectangular cross section: The structure and the transmission characteristics of this type of waveguide are reported in "UV laser-biotissue interactions and delivery systemsm," Y. Hashishin, et al., Proc. Soc. Photo-Opt. Instrum. Eng., vol. 2977, pp. 105–114 (1997). As illustrated in FIG. 5, a pair of metal strips 11 and a pair of dielectric spacers 12 form the waveguide with the rectangular core. The metal strips are usually aluminum sheets or phosphor bronze sheets coated with an aluminum film. Because the transmitted light is reflected only at the surface of the metal strips, the material of spacers can be any type of dielectric such as Teflon. The advantage of this type of waveguide is that a polishing of the surface of metal strips is much easier than the polishing of inner surface of the metal tube. The waveguide composed of the aluminum-coated, phosphor bronze strips shows a high transmission and a high-energy threshold for excimer laser light. However, the rectangular hollow waveguide has a disadvantage on the flexibility. The direction of bending is limited by the structure. Furthermore, it is difficult to fabricate a waveguide with a small cross-sectional size. The typical size of the waveguide fabricated so far is a cross section of 8 mm×0.5 mm and thus, the waveguide is not flexible enough for applications such as medical treatment.

SUMMARY OF THE INVENTION

The present invention is a flexible hollow waveguide for ultraviolet light and a method for making the waveguide. By overcoming the above disadvantages of the prior art, the present invention provides both of high transmissivity of ultraviolet light and high flexibility that meet the need for transmission medium for ultraviolet light such as excimer laser light.

To accomplish the high power threshold, the present invention basically adopts the hollow waveguide structure with the air core that shows almost no absorption loss for ultraviolet light. Moreover, the hollow structure eliminates a reflection loss at the input and output ends of the waveguide whereas the reflection at the fiber's ends seriously affect the power threshold of solid-core, silica-based optical fibers. The core region may be filled with a gas that has little absorption for ultraviolet light, such as nitrogen, helium, or argon.

In the present invention, a thin-wall, small-bore, glass tube is utilized as a base material of the waveguide. Therefore, the waveguide provides high flexibility and can be easily bent into any direction with a relatively large curvature.

To obtain a high transmissivity, the waveguide in the present invention has a thin aluminum film on the inside of the glass tube. Since aluminum shows the highest reflection coefficient for ultraviolet light among metals that are commonly used as a mirror, the waveguide with the inner aluminum coating provides high transmissivity for ultraviolet light. Although a thin layer of aluminum oxide is naturally formed in the air atmosphere, the thickness of the aluminum oxide layer is the order of tenth of nanometer, and therefore, it does not affect the reflectivity of ultraviolet light. In addition, the oxide layer acts as a protective coating that keep the metallic aluminum from chemical degradation.

The inner surface of the glass tube is usually very smooth and the aluminum film on the glass surface is very thin with the thickness of less than 1 mm. Thus, the surface of the aluminum film is also very smooth with the surface roughness of less than 50 nm in root mean square value. This smoothness makes a scattering loss of transmitted ultraviolet light very low and results in low attenuation of transmitted light.

The invention also provides a method of making such hollow waveguides, including a chemical-vapor-deposition process that forms a metallic aluminum film with a very smooth surface on the inside of the glass tube. Th fabrication process is simple and relatively inexpensive.

The above and other objects, features and advantages of the present invention will become apparent from the following description when taken in conjunction with the accompanying drawings in which a preferred embodiment of the present invention is shown by way of illustrative examples.

DETAIL DESCRIPTION OF THE INVENTION

Preferred embodiments of the present invention will hereinafter be described with reference to the accompanying drawings.

Figure 1:
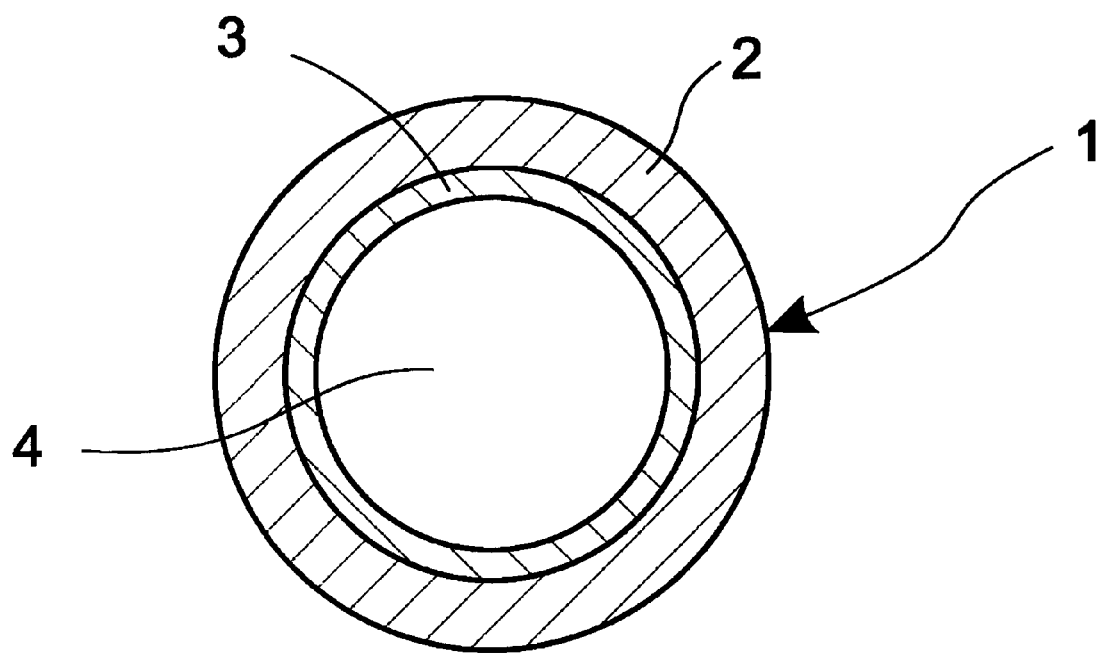
FIG. 1 is a cross-sectional view of an embodiment of the hollow waveguide for ultraviolet light according to the present invention, showing its construction.

FIG. 1 is a cross sectional view of an embodiment of the hollow waveguide according to the present invention. As shown in the same figure, the hollow waveguide 1 is composed of a glass tube 2, an aluminum film 3 on the inside of the glass tube, and a hollow core region 4.

The glass tube 2 can be any kind of glass materials because the tube has no effect on the optical property of the hollow waveguide. However, since the glass tube gives the waveguide a mechanical structure, the tube is preferably flexible and has a mechanical strength so that the waveguide bears many kinds of application. To obtain a high flexibility, the bore diameter of the glass tube is preferably smaller than 3 mm and the wall thickness of the glass tube is preferably thinner than 0.5 mm. The inner surface of the glass tube 2 is preferably very smooth because it has a great influence on the smoothness of the aluminum film 3 formed on the glass tube 2. The surface roughness is preferably less than 50 nm in root-mean-square value. A protective sheath (which may be a polymer coating, polyimide, silicone, metal or other material) is preferably formed around or onto the outer surface of the glass tube 2, such as a commercially available, thin-wall silica-glass tubing. The protective sheath keep the glass tube from scratches that causes a fatal crack in the glass tube.

Ultraviolet light launched into the bore of the hollow waveguide 1 is transmitted in the waveguide while being reflected at the boundary between the aluminum film 3 and the hollow core region 4. The hollow core region 4 is usually filled with the air, however, it may be filled with a gas that has little absorption for ultraviolet light, such as nitrogen, helium, or argon.

The aluminum film 3 is preferably thicker than the skin depth for transmitting light so that the energy of light does not leak to the glass tube 2. However, when the aluminum film is too thick, the surface roughness usually tends to be large. Therefore, the thickness is preferably 50 nm to 500 nm in this invention. To reduce the attenuation loss, the reflectivity for transmitted light at the inner surface of the hollow waveguide is preferably high that is close to 100%. In this point, aluminum is one of the best materials because it shows very high reflectivity in the ultraviolet region. For ultraviolet light with a short wavelength, the surface of the aluminum film 3 is preferably very smooth to suppress the scattering loss of the light when reflected at the surface.

Figure 2:
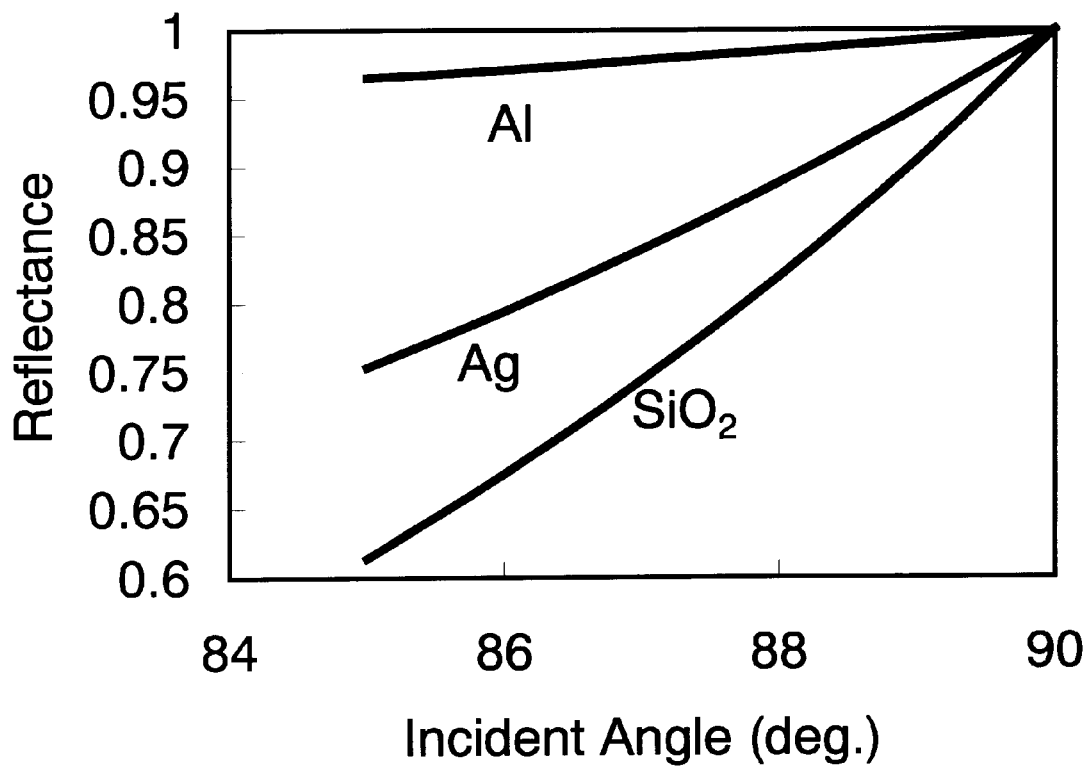
FIG. 2 is a graph of calculated reflectance of ultraviolet light at the wavelength of 248 nm, for aluminum, silver, and silica glass.

FIG. 2 shows calculated reflectance of aluminum, silver, and silica glass at the wavelength of 248 nm that is KrF-excimer laser wavelength. The reflectance is shown as a function of incident angle. It is obvious that aluminum has a very high reflectance and it is one of the best mirror materials for ultraviolet light.

Figure 3A:
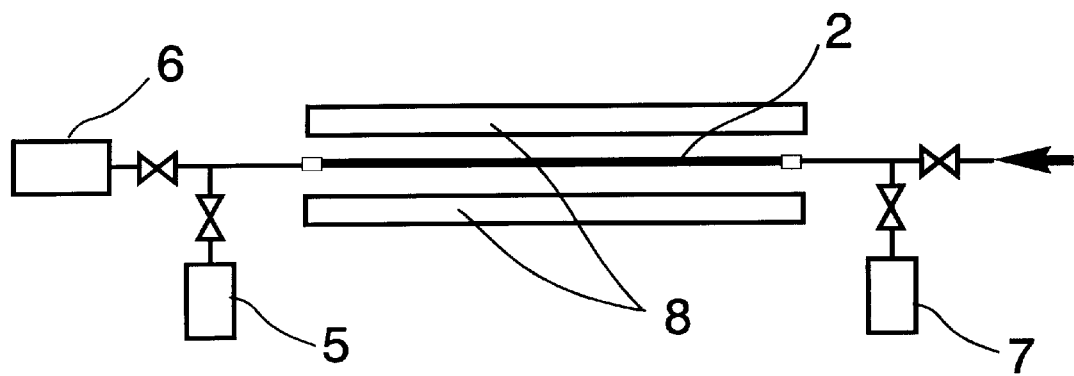
FIG. 3a is a diagrammatic representation of one form of the apparatus for coating an aluminum film inside the base glass tubing.

FIG. 3a is a diagrammatic representation of one form of the apparatus for coating an aluminum film inside the base glass tubing. A vapor of aluminum precursor that is preferably trimethylamine:alane, triethylamine:alane, dimethylethylamine:alane, trimethylaluminum, triethylaluminum, or triisobutylaluminum is injected into the bore of the glass tube 2.

Among these precursors, dimethylethylamine:alane is the most preferable since it is not pyrophoric and easy to handle. In addition, dimethylethylamine:alane has a relatively high vapor pressure and it is liquid at a room temperature, and thus, the vapor is easily generated by bubbling the liquid. In the fabrication process, dimethylethylamine:alane is kept at the temperature of 10–20° C. By bubbling with argon or hydrogen gas at the flow rate of 0.1–5 cc/min, the vapor is generated and it is injected into the base glass tube 2. The vapor may be directly generated without a carrier gas by heating the precursor liquid.

Before the deposition process, the bore of the glass tube 2 is evacuated at a pressure of less than $10^{-3}$ Pa by using a turbo molecular pump or an oil diffusion pump 5 that is connected to the glass tube 2. During the deposition process, a rotary pump or a mechanical booster pump 6 is used to keep the inside pressure of the tube at 500–2000 Pa. To sensitize the inside surface of the glass tube 2, it is preferable to let a vapor of titanium tetrachloride flow in the bore of the glass tube 2. By this pretreatment process, the inside surface of the glass tube 2 is sensitized and it lowers the deposition temperature of aluminum. As a result, an aluminum film with a very smooth surface is deposited on the inside of the glass tube. To generate the vapor, the valve of the vessel 7 with titanium chloride is opened at a pressure of 500–2000 Pa, and the vapor is injected into the glass tube 2 for 1–3 minutes.

After the sensitizing process, the tube 2 is evacuated for 30–60 minutes by the turbo molecular or oil diffusion pump 5. Then the vapor of precursor is injected into the bore of glass tube 2. While the precursor vapor is flowing in the bore, by heating the tube 2 from outside by a cylindrical heater 8 at the temperature of 80–200° C., an aluminum film is deposited on the inside of the glass tube 2. At a higher temperature, the deposition rate is too high and it results in a rough surface of the film. Therefore, it is preferable to set the deposition temperature less than 120° C.

Figure 3B:
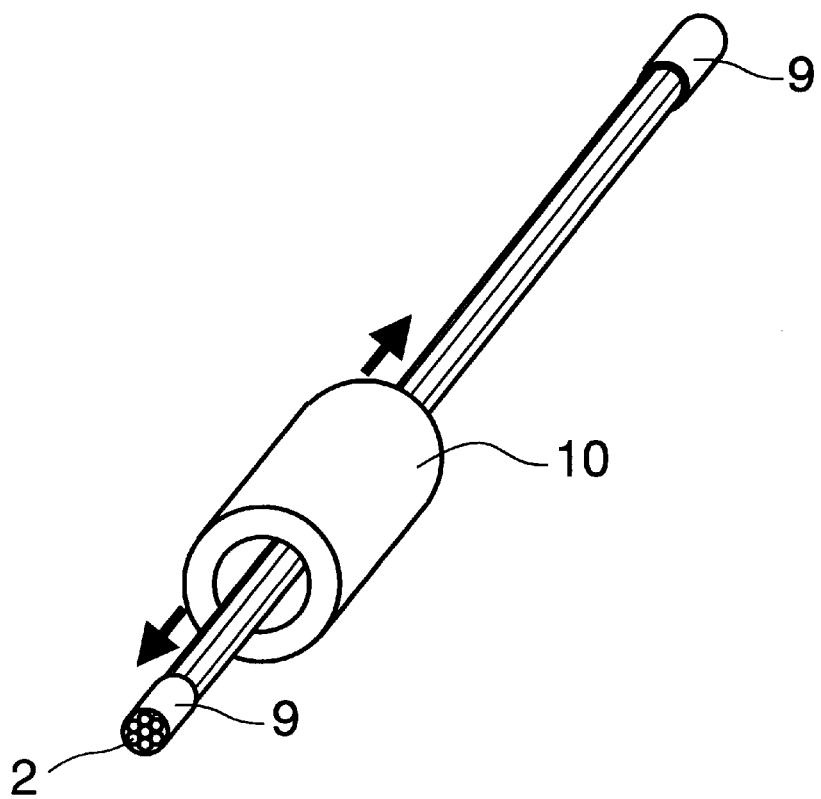
FIG. 3b is a schematic view of the apparatus for coating aluminum films on the inside of the more than one long glass tubes simultaneously.

FIG. 3b is a schematic view of the apparatus for coating aluminum films on the inside of the more than one long glass tubes simultaneously. In the case of FIG. 3b, seven glass tubes 2 are bundled using sleeves 9 and an adhesive. In this case, the length and the bore size of the each glass tubes 2 are 1 m and 1 mm, respectively. To form an aluminum film with a uniform thickness in the long glass tubes 2, a small cylindrical heater 10 that is heated at the temperature of 80–200° C. is moved along the tubes at a speed of 1–10 cm/min. To keep the vapor from condensation, the whole length of the glass tubes 2 may be heated at the temperature of 25–40° C. by using another furnace or a tape heater.

Figure 4:
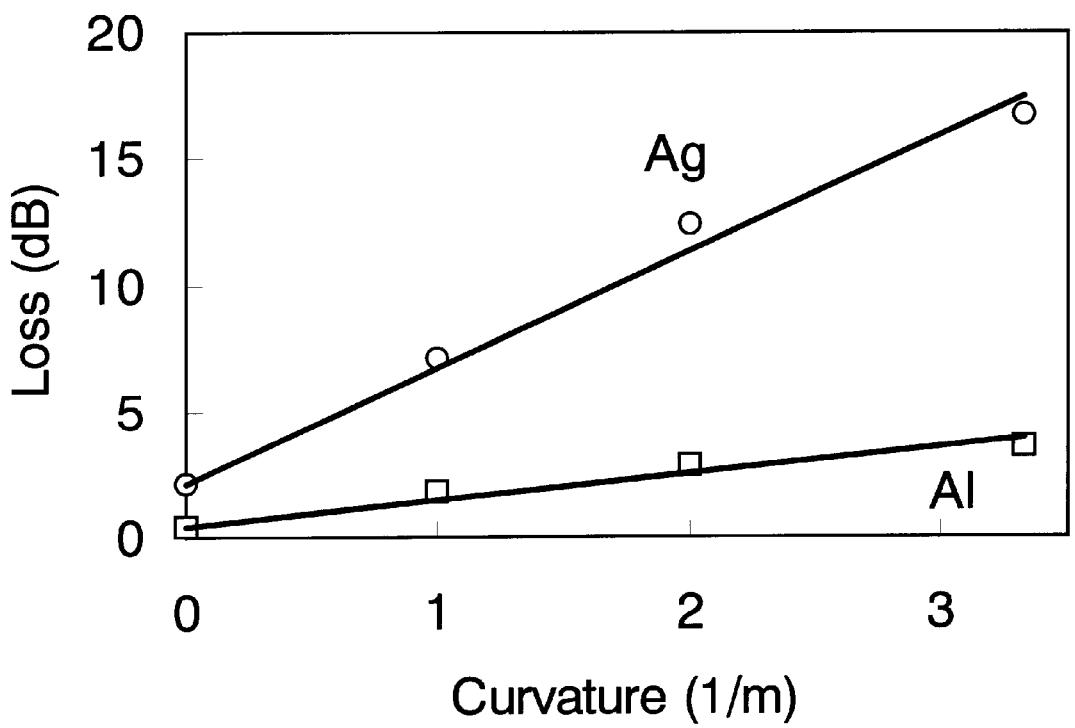
FIG. 4 is a graph of measured transmission losses of a waveguide in the present invention.
Figure 5:
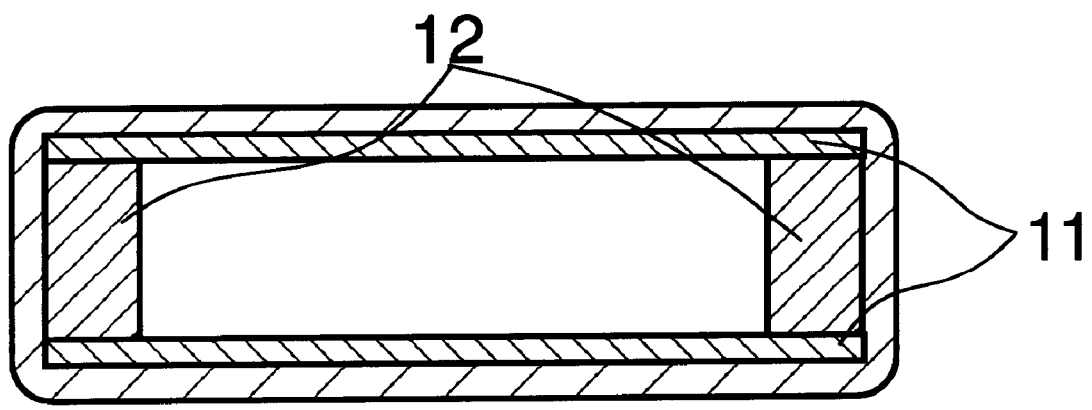
FIG. 5 is a cross-sectional view of a conventional waveguide for ultraviolet light.

FIG. 4 is measured transmission losses of a waveguide in the present invention. The losses were measured by using a KrF-excimer laser with the wavelength of 248 nm. The bore diameter of the waveguide was 1 mm and the length was 1 m. In the measurement, by using a lens with the focal length of 200 mm, the laser beam was focused onto the incident end of the hollow waveguide. The energy of the laser beam was around 10 mJ and the repetition rate was around 50 pps. When measuring the bending losses, the first 20-cm of the waveguide was fixed to be straight and the rest of the waveguide that was 80 cm in length were bent at a uniform radius using a bending jig. Losses of a hollow waveguide with a silver film on the inside of the glass tube are also shown in the figure for comparison. The size of the silver hollow waveguide was the same as the aluminum hollow waveguide. The silver hollow waveguide was fabricated using a conventional mirror plating technique The straight loss of the aluminum hollow waveguide was as low as 0.4 dB/m that is equal to transmissivity of 92%/m. The loss of the aluminum waveguide was much lower than that of the silver waveguide that was 2.1 dB/m (62%/m transmission). When the waveguides were bent, the advantage of the aluminum coating appeared more remarkably. At the curvature of 3.3 (bending radius: 30 cm), the loss of the aluminum waveguide was 3.6 dB that was much lower than the loss of the silver waveguide that was 17 dB. Furthermore, degradation in the transmission characteristics or damage on the waveguide was not found after transmission of more than 10,000 pulses. From these measured results, the advantage of the aluminum hollow waveguide in the present invention is clearly shown.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

We claim:

1. A hollow waveguide for transmission of ultraviolet light, comprising:
   (a) a glass tube having a thin wall-thickness and a bore less than approximately 1.5 mm in diameter, so that said glass tube has high flexibility; and
   (b) a thin aluminum film on the inner surface of said glass tube, said aluminum film has a smooth surface, so that a scattering loss becomes low when transmitted light is reflected at the film surface; and
   (c) a thin aluminum oxide film on said aluminum film which is naturally formed for protection of said aluminum film against deterioration.

2. The hollow waveguide according to claim 1 wherein said aluminum film is deposited by a chemical-vapor-deposition process which is performed by injecting a vapor of aluminum precursor into the bore of said glass tube.

3. The hollow waveguide according to claim 1 wherein said process includes injection of a vapor of titanium tetrachloride into the bore of glass tube before deposition of the aluminum film.

4. The hollow waveguide according to claim 1 wherein said aluminum precursor is trimethylamine:alane, triethylamine:alane, dimethylethylamine:alane, trimethylaluminum, triethylaluminum, or triisobutylaluminum.

* * * * *